F. Davison,
Making Cut Nails,

N°. 77,262.  Patented Apr. 28, 1868.

Witnesses:
W. C. Ashkettle
Wm A Morgan

Inventor:
F. Davidson
per Munn & Co
Attorneys

United States Patent Office.

F. DAVISON, OF RICHMOND, VIRGINIA.

Letters Patent No. 77,262, dated April 28, 1868.

---

IMPROVED NAIL-MACHINE.

---

The Schedule referred to in these Letters Patent and making part of the same.

---

TO ALL WHOM IT MAY CONCERN:

Be it known that I, F. DAVISON, of Richmond, in the county of Henrico, and State of Virginia, have invented a new and improved Machine for Making Nails; and I do hereby declare that the following is a full, clear, and exact description thereof, which will enable those skilled in the art to make and use the same, reference being had to the accompanying drawings, forming part of this specification.

This invention relates to a new and improved machine for making cut nails, and it consists in a peculiar construction and arrangement of parts, as hereinafter fully shown and described, whereby a very simple and efficient machine for the purpose is obtained. In the accompanying sheet of drawings—

Figures 1, 2:
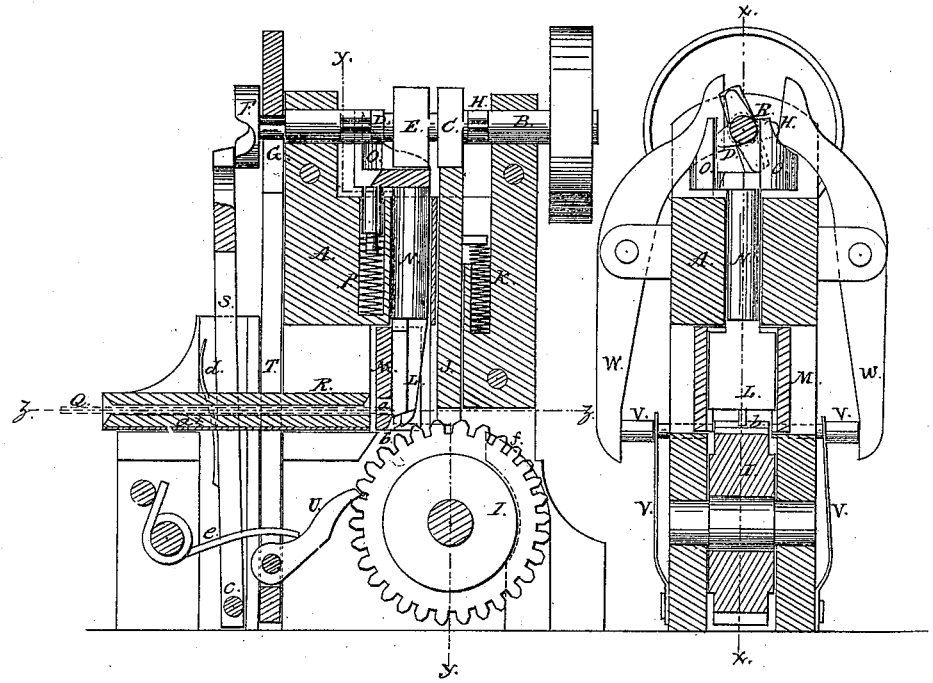

Figure 1 is a side sectional view of my invention, taken in the line $x\,x$, fig. 2.

Figure 2, a transverse vertical section of the same, taken in the line $y\,y$, fig. 1.

Figure 3:
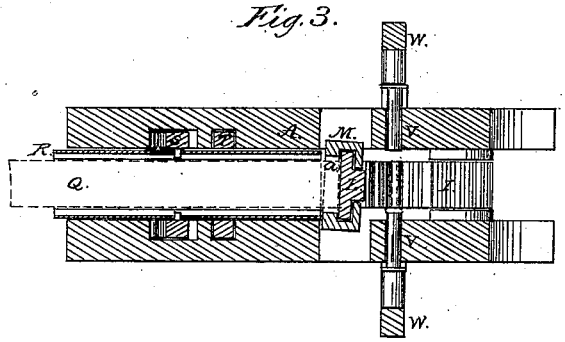

Figure 3, a horizontal section of the same, taken in the line $z\,z$, fig. 1.

Similar letters of reference indicate corresponding parts.

A represents the frame or stock of the machine in which the working parts are placed. B is the driving-shaft placed on the upper part of the frame or stock, and provided with six cams, C, D, E, F, G, and H, each of which performs a separate function, as will be presently shown.

In the lower part of the frame or stock A there is placed a rotary female die, I, which closely resembles a toothed wheel, the spaces between the teeth being the dies, and corresponding in shape to the desired taper form of the nails to be cut.

J is a male die, which is fitted vertically in the frame or stock A, and works between the teeth of the wheel I, down between the bevelled surfaces thereof, as shown in fig. 1, said die J, in its descent, holding the nails in the wheel or die J.

This male die J is forced down to its work by the cam C on shaft B, and is raised by a spring, K, as shown clearly in fig. 1.

L represents a cutter, which cuts the nails from the plate, or, rather, the pieces of which the nails are formed.

This cutter is fitted in a box, M, and is allowed to slide freely up and down therein, (see fig. 3,) and the box M is fitted in a recess or opening in the stock or frame, which recess or opening is of sufficient capacity to admit of the box being slightly turned or vibrated, first in one direction and then in the other, in order that the cutter L may make oblique cuts, and cut the nail-blanks in taper form, in order to give the proper taper form to the nails.

The cutter L is provided with a cylindrical shank, N, which extends upward through the top of the frame or stock A, and has two flanges, O O, on its upper end, against which the cam D alternately acts and gives the turning-movement to the box M.

The cutter L has a downward movement given it by the cam E, a spring, P, raising the cutter, (see fig. 1.)

The box M has an oblong slot, $a$, made in it for the nail-plate Q to pass through, the length of the feed-movement of said plate being determined by a lip, $b$, on the cutter, shown in figs. 1 and 2.

R represents a tube, through which the nail-plate or bar is fed to the cutter L.

This tube is lined with a non-conducting material, $a^\times$, plaster of Paris for instance, to retain the heat, and prevent the radiation of the same from the nail-plate or bar.

The tube R is pivoted in an upright, S, the lower end of which is fitted on a shaft, $c$, on which it works freely.

One or more springs, $d$, are attached to the outer side of the upright, S, and the cam F acts against the upper part of the upright, said cam moving the upright in one direction, and the spring or springs moving it in the other direction.

T represents a rising and falling upright, which is actuated by the cam G, and has a pawl, U, in its lower part, which engages with the rotary die I, as shown clearly in fig. 1, the spring being kept in contact with the die by a spring, $e$.

Within the frame or stock, at each side of the die I, at its outer part, there is a curved ledge, $f$, the outer edges of which are slightly eccentric with the die, (see fig. 1.)

These curved ledges serve to discharge the finished nails from the machine, as will be presently explained.

At each side of the frame or stock A there is a heading-die, V, which is actuated by levers W W, the latter being operated alternately by the cam H.

The dies V are thrown outward by springs Y Y, shown clearly in fig. 2.

The operation is as follows:

The nail-plate or bar Q is properly heated and inserted in the tube R, its end passed through the slot $a$ in the box M, and brought in contact with the lip $b$, which serves as a stop.

The cutter L is forced down by the cam E, and a blank cut off from the plate or bar Q with a slightly oblique cut, owing to the oblique position of the box M, as previously alluded to.

This nail-blank drops into a space between the teeth of the die or wheel I, and is carried around underneath the die J by the elevation of the upright, T, under the action of the cam G, and when the nail-blank is underneath the die J, the latter is forced down by the cam C, so that it will hold the nail-blank firmly in the wheel, and the heading-die V, which is opposite the thickest end of the nail-blank, is then forced inward under the action of cam H, and forms the head on said end of the nail, and against the side of the wheel I and die J, the nail-blanks being of sufficient length, somewhat longer than the width of the wheel, to admit of this result.

The die J then rises, and the wheel I moved, after a succeeding nail has been cut and dropped into it, as before, the nail-plate or bar Q being fed to the cutter L each time after the latter has been moved upward by the spring P.

The heads of the nails are formed alternately at opposite sides of the wheel I, the dies V V acting alternately as the nail-blanks are cut-off from the plate or bar Q consecutively with a reverse oblique cut.

The finished nails are discharged from the wheel in consequence of the heads and points catching over the ledges $f$, the eccentricity of the latter, as the wheel rotates, throwing them out from the wheel.

I would remark that I do not confine myself to the precise position of the parts herein shown and described; as, for instance, they may be placed so that the nail-plate or bar may be fed vertically to the cutter, and the same end attained.

I claim as new, and desire to secure by Letters Patent—

1. The rotary wheel or die I, in combination with the plunger or die J, vibrating-cutter L, and box M, all arranged to operate in the manner substantially as and for the purpose specified.

2. The feed-tube Q, lined with a suitable non-conducting material, and arranged to operate in connection with the cutter by means of spring-bar S and cam F, substantially in the manner as and for the purpose set forth.

3. The combination of the feed-tube R, box M, cutter L, wheel I, plunger or die J, and discharging-ledges $ff$, all arranged for joint operation substantially as and for the purpose specified.

F. DAVISON.

Witnesses:
   THOS. D. ALLEN,
   JOSEPH MANUEL.